United States Patent
Weinberger et al.

(10) Patent No.: US 7,168,856 B1
(45) Date of Patent: Jan. 30, 2007

(54) WET CUP THROAT SEAL AND BEARING ASSEMBLY

(76) Inventors: Mark T. Weinberger, 8011 Eastwood Rd., Mounds View, MN (US) 55112; James P. Korzenowski, 715 Main St. NE., Minneapolis, MN (US) 55413; Mark D. Hilde, 14240 34th St. North, Stillwater, MN (US) 55082

( * ) Notice: Subject to any disclaimer, the term of this patent is extended or adjusted under 35 U.S.C. 154(b) by 0 days.

(21) Appl. No.: 10/009,080

(22) PCT Filed: May 23, 2000

(86) PCT No.: PCT/US00/14185

§ 371 (c)(1),
(2), (4) Date: Nov. 29, 2004

(87) PCT Pub. No.: WO00/75524

PCT Pub. Date: Dec. 14, 2000

(51) Int. Cl.
*F16C 29/02* (2006.01)
*F16J 15/18* (2006.01)

(52) U.S. Cl. .............................. 384/16; 92/168; 384/28
(58) Field of Classification Search .................. 384/16, 384/26, 28, 29, 32, 147, 149, 151, 153, 299–301, 384/129, 130, 138; 92/168
See application file for complete search history.

(56) References Cited

U.S. PATENT DOCUMENTS

| | | | |
|---|---|---|---|
| 3,389,918 A | | 6/1968 | Burns |
| 3,518,920 A | * | 7/1970 | Bimba .................... 384/300 |
| 3,870,381 A | * | 3/1975 | Overkott .................. 384/16 |
| 3,887,196 A | | 6/1975 | Renfrow |
| 3,927,871 A | * | 12/1975 | de Baan .................. 384/16 |
| 4,323,003 A | * | 4/1982 | Clippard, III ............ 384/16 |
| 4,448,551 A | | 5/1984 | Murphy |
| 4,528,899 A | | 7/1985 | Heina |
| 4,729,145 A | * | 3/1988 | Egner-Walter et al. ....... 384/16 |
| 4,917,509 A | | 4/1990 | Takano |
| 4,976,192 A | | 12/1990 | Grach |
| 5,098,071 A | * | 3/1992 | Umetsu .................. 384/16 |
| 5,251,986 A | | 10/1993 | Arena |
| 5,385,422 A | | 1/1995 | Kruger |
| 5,553,868 A | | 9/1996 | Dunford |
| 5,820,270 A | | 10/1998 | Richardson |

* cited by examiner

*Primary Examiner*—Thomas R. Hannon
(74) *Attorney, Agent, or Firm*—Douglas B. Farrow

(57) ABSTRACT

Wet cup throat seal (3) and bearing (2) combination is designed for use in a reciprocating piston pump where in the wet cup (1) is designed to hold the seal assembly thereby insuring proper displacement rod (5) alignment and maximizing seal life. The construction also allows for easy and inexpensive replacement and allows piston seals (6) and throat seals (3) to be interchangeable.

3 Claims, 3 Drawing Sheets

WET CUP THROAT SEAL AND BEARING ASSEMBLY

TECHNICAL FIELD

A wet cup throat seal and bearing combination is designed for use in a reciprocating piston pump where in the wet cup is designed to hold the seal assembly.

BACKGROUND ART

Wet cups and throat seals are well known for use in reciprocating piston pumps. While prior art devices have been generally satisfactory, it is always desirable to increase ease of manufacture, seal life and ease of servicing while decreasing cost.

DISCLOSURE OF THE INVENTION

A wet cup is machined from hexagonal stainless steel bar stock. A bearing is a cut shoulder bearing which is machined from acetal bar. The throat seal is a standard U-cup seal. The wet cup and the bearing are assembled into an outlet housing. The bearing guides the displacement rod and the seal prevents leakage as the displacement rod reciprocates.

The wet cup and cylinder are sized so that the piston seals and throat seals are interchangeable. The shoulder on the bearing insures that the bearing will remain coaxial with the wet cup and the pump. The combination can be serviced by unscrewing the wet cup from the outlet housing while the bearing and throat seal can be removed from the wet cup without tools.

These and other objects and advantages of the invention will appear more fully from the following description made in conjunction with the accompanying drawings wherein like reference characters refer to the same or similar parts throughout the several views.

BEST MODE FOR CARRYING OUT THE INVENTION

Figure 1:
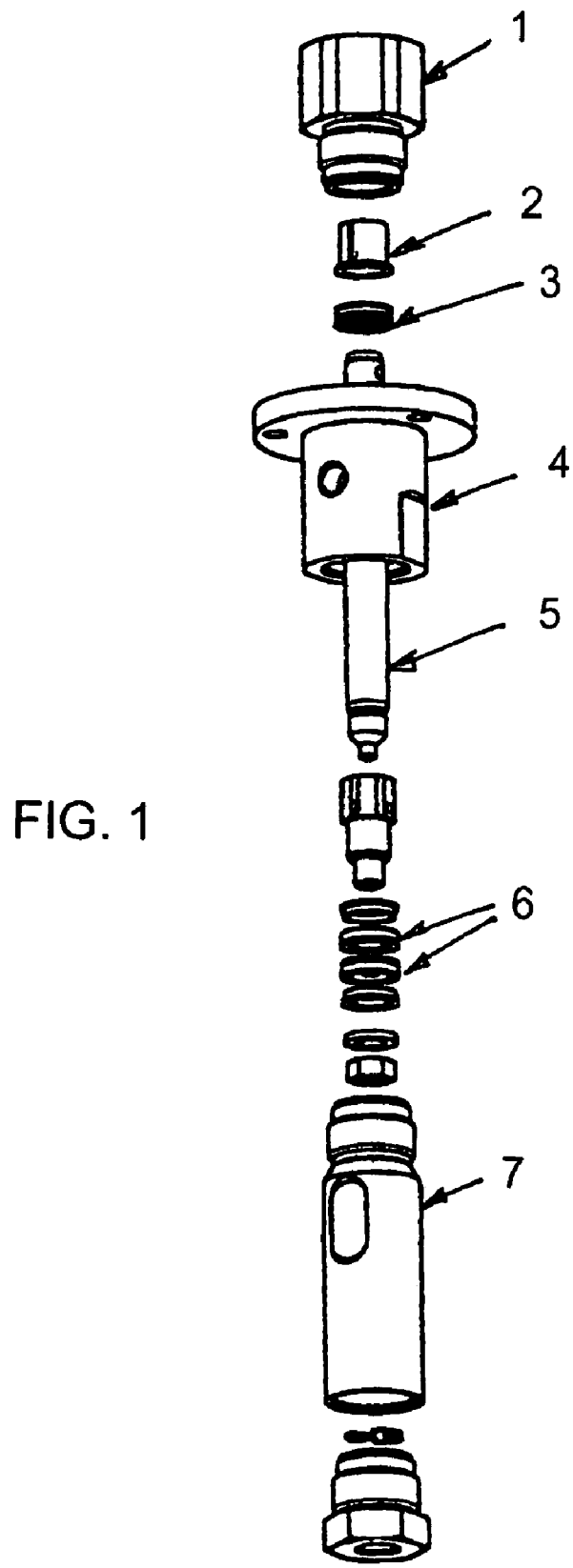
FIG. 1 is an exploded view of a pump utilizing the inventive wet cup bearing and seal assembly.
Figure 2:
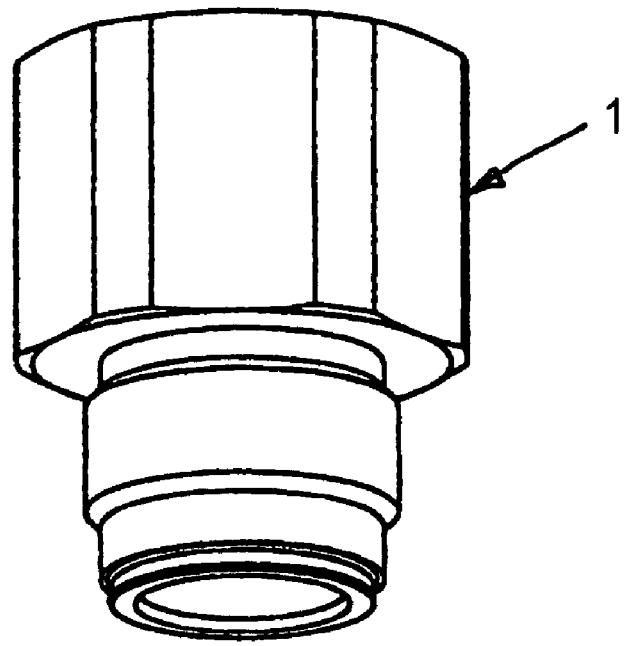
FIG. 2 is an exploded view of the inventive wet cup bearing and seal assembly.
Figure 2:
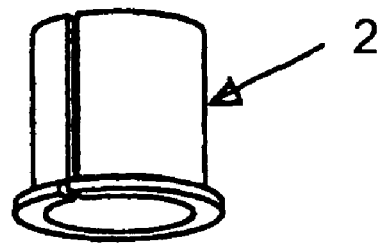
Figure 2:
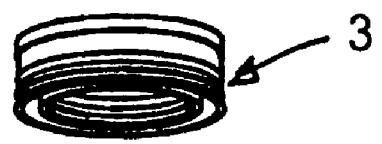
Figure 3:
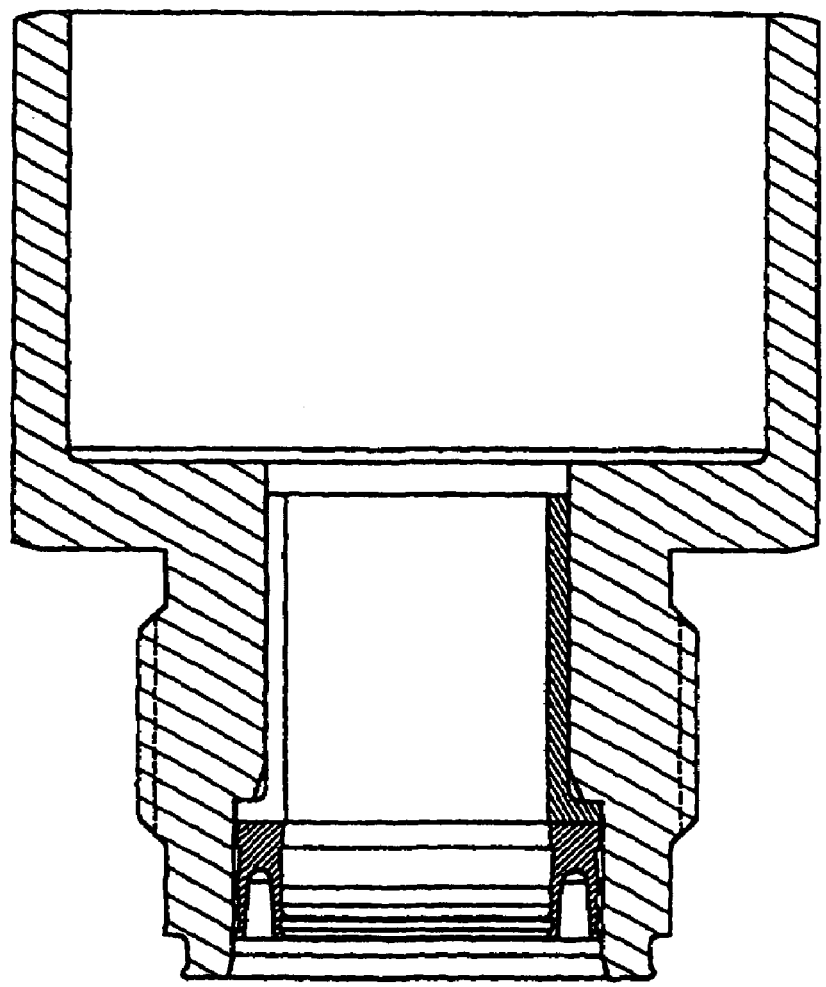
FIG. 3 is a cross-sectional view of the inventive wet cup bearing and seal assembly.

Wet cup 1 is machined from hexagonal stainless steel bar stock. Bearing 2 is a cut shoulder bearing which is machined from acetal bar. Throat seal 3 is a standard U-cup seal. The combination is assembled as shown in FIGS. 1, 2, and 3. Wet cup 1 is assembled into an outlet housing 4 and the bearing 2 to an outlet housing 4. The bearing 2 guides the displacement rod 5 and seal 3 prevents leakage as the displacement rod reciprocates.

Wet cup 1 and cylinder 7 are sized so that piston seals 6 and throat seals 3 are interchangeable. Such a combination insures long seal life in acid catalyzed lacquers without requiring adjustments to the seals. The shoulder on the bearing insures that the bearing will remain coaxial with the wet cup and the pump. The combination can be serviced by unscrewing the wet cup 1 from the outlet housing 4 while the bearing 2 and throat seal 3 can be removed from the wet cup without tools. There is no requirement to disassemble the remainder of the displacement pump.

In the event of throat seal failure and there are no spare seals on hand, a use could switch the downward facing piston seal and the throat seal and continue operating the pump.

It is contemplated that various changes and modifications may be made to the assembly without departing from the spirit and scope of the invention as defined by the following claims.

The invention claimed is:

1. A wet cup throat seal and bearing assembly in combination with a reciprocating piston pump having a housing and a displacement rod which reciprocates along an axis, said assembly comprising:
   a wet cup threadedly engaged in said housing, said wet cup comprising a space around said displacement rod for retaining fluid during normal use;
   a plastic bearing having a shoulder and a cut parallel to said axis; and
   a throat seal, wherein said bearing and said throat seal are disposed around said displacement rod and retained between said displacement rod and said wet cup.

2. The wet cup throat seal and bearing assembly of claim 1 wherein said throat seal is a U-cup seal.

3. The wet cup throat seal and bearing assembly of claim 1 wherein said bearing is formed from acetal.

* * * * *